Figure 1:
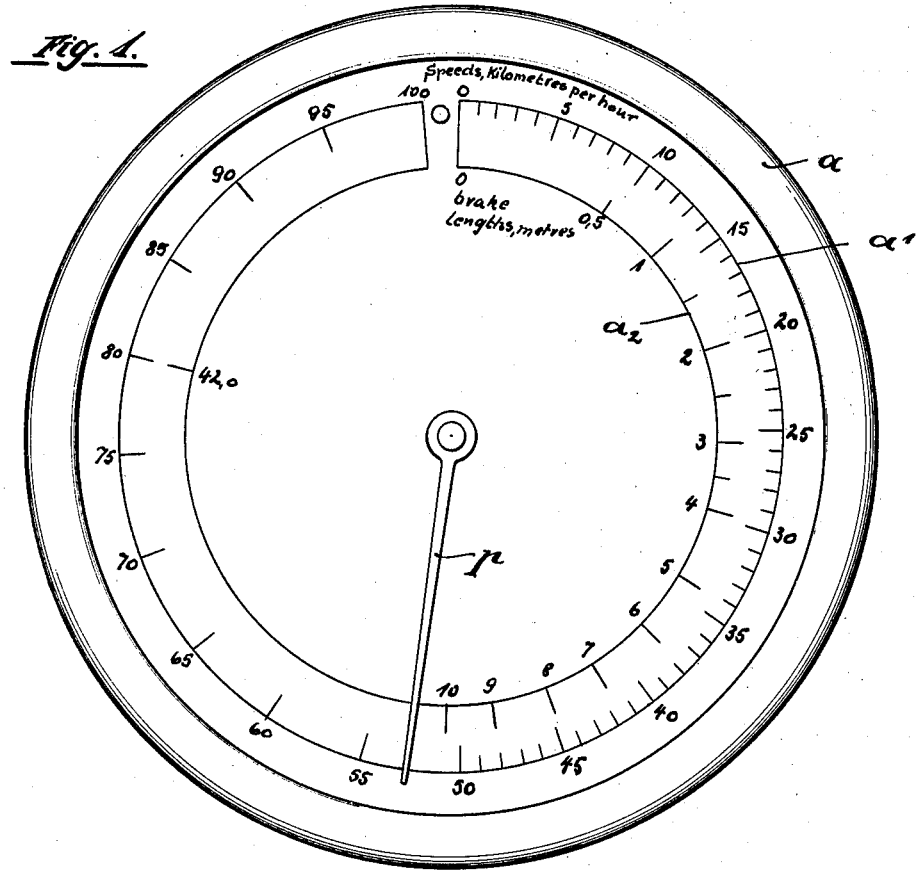

Jan. 3, 1933.  A. KREIDLER  1,893,090
INDICATING DEVICE
Filed June 30, 1928   4 Sheets-Sheet 1

Inventor:
Alfred Kreidler
by Krümmling
Atty.

Jan. 3, 1933.  A. KREIDLER  1,893,090
INDICATING DEVICE
Filed June 30, 1928  4 Sheets-Sheet 2

Inventor:
Alfred Kreidler
by Kinehart
Atty.

Jan. 3, 1933.  A. KREIDLER  1,893,090
INDICATING DEVICE
Filed June 30, 1928  4 Sheets-Sheet 3

Inventor:
Alfred Kreidler

Jan. 3, 1933.　　A. KREIDLER　　1,893,090
INDICATING DEVICE
Filed June 30, 1928　　4 Sheets-Sheet 4
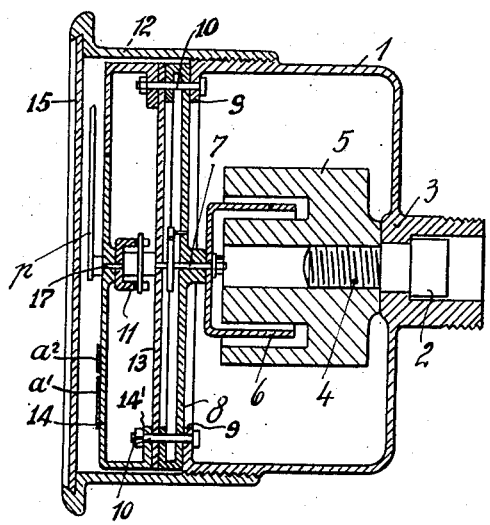
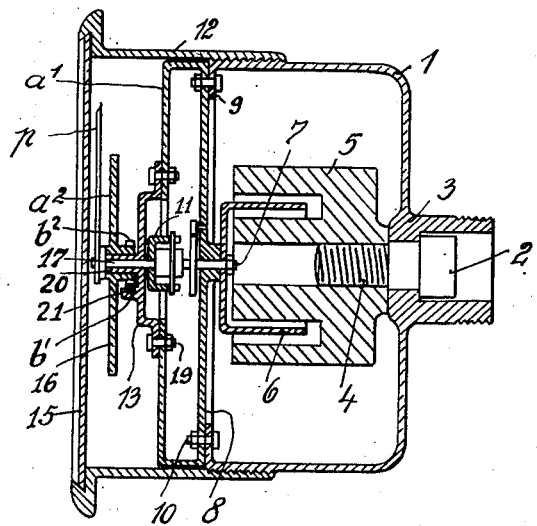
Inventor:
Alfred Kreidler
Atty.

Patented Jan. 3, 1933

1,893,090

UNITED STATES PATENT OFFICE

ALFRED KREIDLER, OF STUTTGART, GERMANY

INDICATING DEVICE

Application filed June 30, 1928, Serial No. 289,377, and in Germany July 7, 1927.

My invention relates to the braking of vehicles and more especially to an instrument for indicating the distances of stopping for a vehicle. It is an object of my invention to provide an instrument of this type in which the distances of stopping for predetermined conditions such as speed and incline, or factors for calculating the distances of stopping, are indicated.

To this end I combine with a speed graduation a graduation bearing indications relating to distances of stopping.

In an instrument embodying my invention I may combine with a speedometer a fixed scale for the distances of stopping corresponding to the speeds, provided the vehicle is running on the level, and I may provide means for correcting the standard distances of stopping indications of this fixed scale in conformity with the indications of an inclinometer, or for indicating a factor by which they are corrected by a comparatively simple calculation. I may also subdivide the scale indicating the distances of stopping into a plurality of marks each bearing a definite indication, and provide means for placing such marks opposite the speeds to which they correspond. This facilitates the adaptation of my invention to existing speedometers in which the marks may be adjusted and fixed in positions which correspond to the calculated distances of stopping for given speeds.

In a preferred embodiment of my invention I provide means for displacing the scale of distances of stopping in conformity with the indications of an inclinometer so that the distances of stopping corresponding to a given speed and a given incline are read directly. Conversely I may also combine a speedometer with an inclinometer so that the scale of distances of stopping is displaced in conformity with the indications of the speedometer.

My invention is particularly useful for, though not limited to, motor cars. With the ever increasing density of traffic it is very difficult for drivers of motor cars to run their cars safely and at high speed, before they have acquired the "feel" which is necessary for the reliable control of a given car. Such feel is acquired even by expert drivers only after long experience with the car, and this applies particularly to the estimation of the distance of stopping which is different for each car as it is influenced by the type of the brake, the weight of the car, and other variables.

Various instruments have already been suggested for giving information to a driver as to the speed of the engine, the speed of the car, the inclination of the road and as to thermic and electrical conditions but no such information has heretofore been supplied with respect to the distance of stopping to be expected under given conditions, so that the human factor plays a paramount part in the determination of the distance of stopping. Obviously this is undesirable as the knowledge of the distance of stopping is practically the most important factor for the driver. The majority of accidents is due to the fact that the driver under-estimates the distances of stopping.

This drawback is overcome according to my invention which eliminates the human factor partly or altogether by providing means for indicating to the driver the distance of stopping to be expected under given conditions.

In the drawings affixed to this specification and forming part thereof, various dials of instruments and means for controlling such dials by the indications of other graduations are indicated diagrammatically by way of example.

Figure 2:
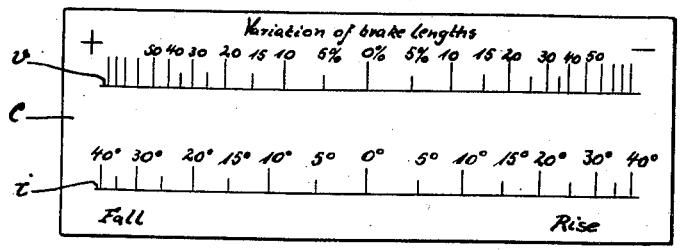
Figure 3:
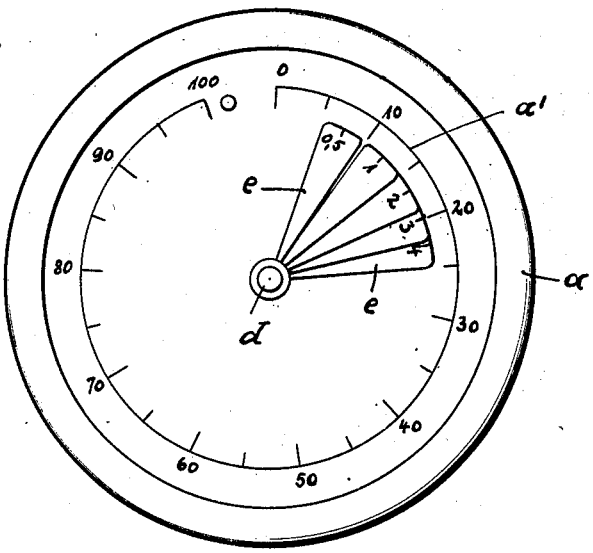
Figure 4:
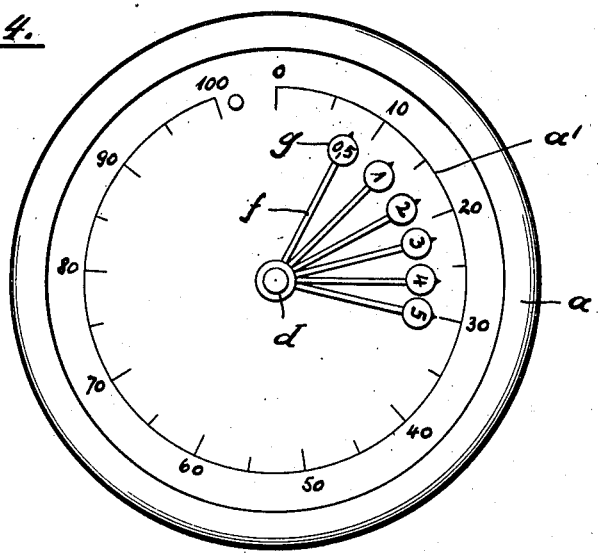
Figure 5:
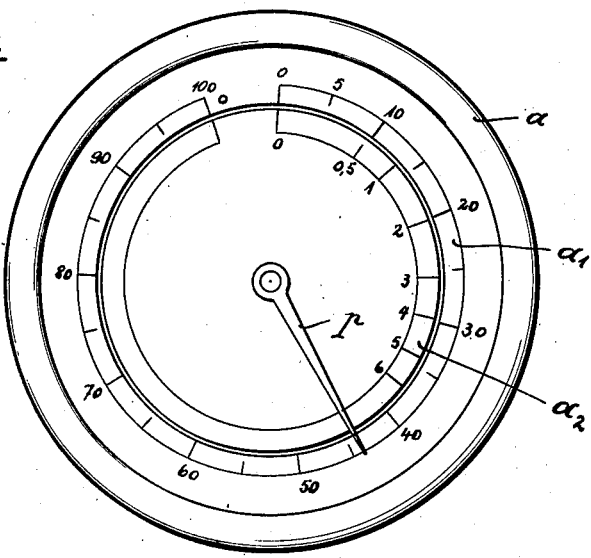
Figure 6:
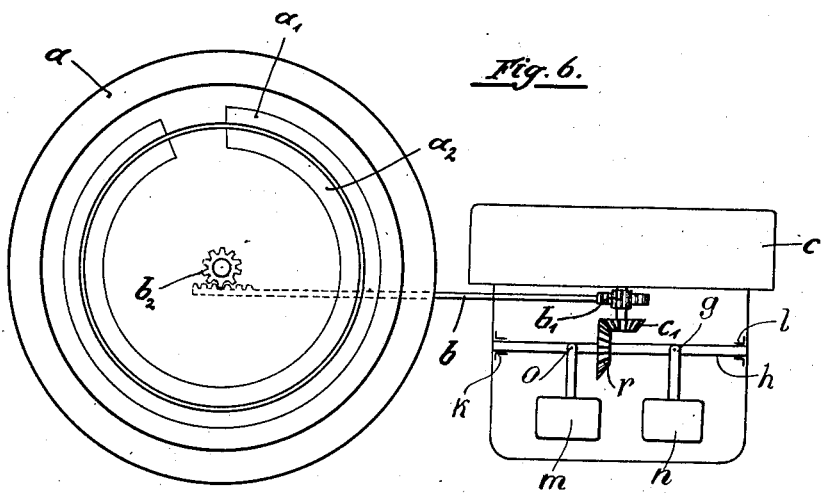

In the drawings:

Fig. 1 is an elevation of a speedometer dial having a fixed scale of distances of stopping, Fig. 2 is an elevation of a dial having a graduation of inclines in combination with a scale of factors for calculating the distances of stopping for roads other than level, Figs. 3 and 4 indicate means for adapting my invention to existing speedometers, Fig. 5 shows the dial of a speedometer having a movable scale for the distances of stopping scale, Fig. 6 is an illustration of an instrument having the movable scale as shown in Fig. 5, and means for adjusting the scale in conformity with the movements of a device responsive to inclinations, Fig. 7 is an axial section of the instrument illustrated in Fig. 1, and Fig. 8 is an axial section of the instrument illustrated in Figs. 5 and 6.

Referring now to the drawings and first to Fig. 1, $a$ is a dial, $a'$ is a speed scale, the speeds being marked in kilometres per hour, $a^2$ is a scale of the distances of stopping in metres corresponding to the speeds indicated on the scale $a'$, and $p$ is the pointer of a speedometer of any suitable type such as shown in Figs. 7 and 8, which cooperates with the scales $a'$ and $a^2$ so that it will indicate the distances of stopping on scale $a^2$ as functions of the speeds on scale $a'$. In the position illustrated in Fig. 1, the pointer $p$ indicates a speed of about 53 kilometres per hour (about 34 M. P. H.) on the scale $a'$ and the corresponding distance of stopping is read on the scale $a^2$. The distances of stopping are for running on a horizontal road.

A speedometer for operating the pointer $p$ is illustrated in Fig. 7. 1 is a casing, with an inwardly projecting flange 9 at its front end, 2 is the shaft of the speedometer which is connected to the wheels of a vehicle by any suitable means such as flexible shafting (not shown), and 3 is a bearing for the shaft 2 at the rear end of the casing. The speedometer shaft 2 is threaded at 4, and 5 is a magnet which is seated on the threaded portion. The magnet has a circular recess in its front face for the reception of a hollow cylindrical armature 6 which is secured on a shaft 7. The shaft 7 is mounted to rotate in a boss at the center of a rear cover 8 which is secured to the flange 9 of the casing 1 by bolts 10. The perimeter of the rear cover 8 is channeled, and 13 is a front cover which is placed on the channeled portion. 14 is a dial which is placed on the front cover 13 with its rear flange 14'. The flanges 9 and 14' and the rear cover 8 are connected by the bolts 10. The speed scale $a'$ is placed on the front face of the dial 14 and surrounds the scale $a^2$ for the distances of stopping which is also secured on the dial 14. 11 is a clutch one half of which is secured to the outer end of the shaft 7 while its other half is seated on a shaft 17 which is mounted to rotate in a central bearing of the dial 14. At its outer end the shaft 17 supports the pointer $p$.

12 is a sleeve which is placed on a thread at the front end of casing 1 and 15 is a glass plate in the sleeve.

The operation of this instrument will be understood from the description of Fig. 1.

Referring now to Fig. 2, $c$ is the dial of an inclinometer having a scale $i$ indicating inclines in per cent, fall being indicated at the left and rise at the right of the zero point indicating "level". The corresponding variations in per cent are indicated at $v$, being marked "+" for fall, and "—" for rise. This dial consequently indicates the variation which the standard or horizontal distance of stopping for a given speed undergoes on an incline.

Referring now to Fig. 3, $a$ is the dial and $a'$ is the speed scale as described with reference to Fig. 1, $d$ is a shaft at the center of the dial, and $e$ are sectors adapted to be turned on the shaft and to be fixed in a given position by any suitable means, not shown. This arrangement is applied to existing instruments, the sectors $e$ being fixed in positions with respect to the speed scale $a'$ which are determined by calculation. Each sector bears a mark indicating a given distance of stopping and this mark is fixed so that the pointer $p$, Fig. 1, while indicating the speeds on the graduations $a'$, at the same time indicates the corresponding distances of stopping on the mark on one of the sectors $e$.

Referring now to Fig. 4, instead of sectors $e$, arms $f$ are adapted to be displaced on the shaft, each bearing a dial $g$, with a given distance of stopping marked thereon. Otherwise the operation of this arrangement is the same as that described with reference to Fig. 3.

Referring now to Figs. 5 and 6, $a$ is the dial of the instrument, $a'$ is the speed scale, and $a^2$ is the scale of distances of stopping. In the present instance, the scale $a^2$ is mounted to rock with respect to the scale $a'$ and means as shown in Fig. 6 are provided for connecting it with a device responsive to inclinations in a casing $c$. $h$ is a shaft which is mounted to rock in the casing $c$ in bearings $k$ and $l$, $o$ and $q$ are arms extending radially from the shaft, and $m$ and $n$ are weights at the outer ends of the arms.

$r$ is a bevel pinion on the shaft $h$ which meshes with a bevel pinion $c'$ on the vertical shaft of a spur pinion $b'$. $b$ is a rack which meshes with the pinion $b'$ at one end, and $b^2$ is a pinion on the shaft on which the scale $a^2$ of distances of stopping is secured. The other end of the rack $b$ meshes with pinion $b^2$.

On an incline the weights $m$, $n$ maintain the arms $o$, $q$ in their vertical position but the casing $c$ assumes an inclined position so that the shaft $h$ is rocked, and the pinion $b'$ is rotated with respect to casing $c$. This rotation is translated into reciprocation of the rack $b$ in a direction corresponding to the character of the incline, i. e., in one direction if it is downhill and in the opposite direction of it is uphill. The position of the scale $a^2$ of distances of stopping is varied in conformity with the incline and the distance of stopping corresponding to the incline and to the speed of the vehicle is indicated by the pointer $p$, Fig. 1, which has been omitted in Fig. 6.

A speedometer for operating the pointer $p$ and for rotating the scale $a^2$ for the distances of stopping, is illustrated in Fig. 8. The casing 1, the sleeve 12 and the means for rotating the shaft 7 through the magnet 5 are the same as those described with reference to Fig. 7. The rear cover 8 is secured to the flanges 9 by the bolts 10 as described but the dial 14 for the speed scale $a'$ is dispensed with. The speed scale is placed on the front face of the rear cover 8 which is cut out at its center, and the front cover 13 is a flanged member which is attached to the outer flange of the rear cover 8 by bolts 19. The shaft 7 is mounted to rotate in the central boss of the rear cover 8 and connected to the extension 17 by the clutching member 11, as described. The front cover 13 has a central boss 20 for the reception of the extension 17, and the dial 16 for the scale $a^2$ of the distances of stopping is mounted to rotate on the boss 20 with a sleeve on which the pinion $b^2$ is formed or secured. 21 is a bracket on the front cover 13 below the pinion $b^2$ in which the rack $b$ is mounted to slide.

The operation of this instrument will be understood from the description of Figs. 5 and 6.

I wish it to be understood that I do not desire to be limited to the exact details of construction shown and described for obvious modifications will occur to a person skilled in the art.

I claim:

1. An instrument for indicating the distances of stopping comprising a vehicle speedometer, a device for indicating the distances of stopping of the vehicle as functions of the speed of the vehicle, and means operatively connecting said indicating device to said speedometer.

2. An instrument for indicating the distances of stopping comprising a vehicle speedometer, a device responsive to inclinations of the road, a device for indicating the distances of stopping of the vehicle as functions of the speed of the vehicle and inclination of the road, and means operatively connecting said indicating device to said speedometer and to said inclination-responsive device.

3. An instrument for indicating the distances of stopping comprising a vehicle speedometer, a device responsive to inclinations of the road, a device for indicating the distances of stopping of the vehicle as functions of speed of the vehicle and inclination of the road, including a movable dial with a scale for the distances of stopping; and means operatively connecting said movable dial to said inclination-responsive device and said indicating device to said speedometer.

4. An instrument for indicating the distances of stopping comprising a scale of vehicle speeds, a scale of distances of stopping for each speed marked on said first-mentioned scale and distance-of-stopping-indicating means for cooperating with both scales.

5. An instrument for indicating the distances of stopping comprising a fixed scale of vehicle speeds, a movable scale of distances of stopping for each speed marked on said first-mentioned scale, distance-of-stopping-indicating means for cooperating with both scales, and an inclination-responsive device for displacing said scale of distances of stopping with respect to said scale of vehicle speeds.

6. An instrument for indicating the distances of stopping comprising a scale of vehicle speeds, a scale of distances of stopping for each speed marked on said first-mentioned scale, and a speed-indicating device for cooperating with both scales.

7. An instrument for indicating the distances of stopping comprising a scale of vehicle speeds, a scale of distances of stopping for each speed marked on said first-mentioned scale, a speed-indicating device for cooperating with both scales, and an inclination-responsive device for displacing said scale of distances of stopping with respect to said scale of vehicle speeds.

In testimony whereof I affix my signature.

ALFRED KREIDLER.